Figure 1:
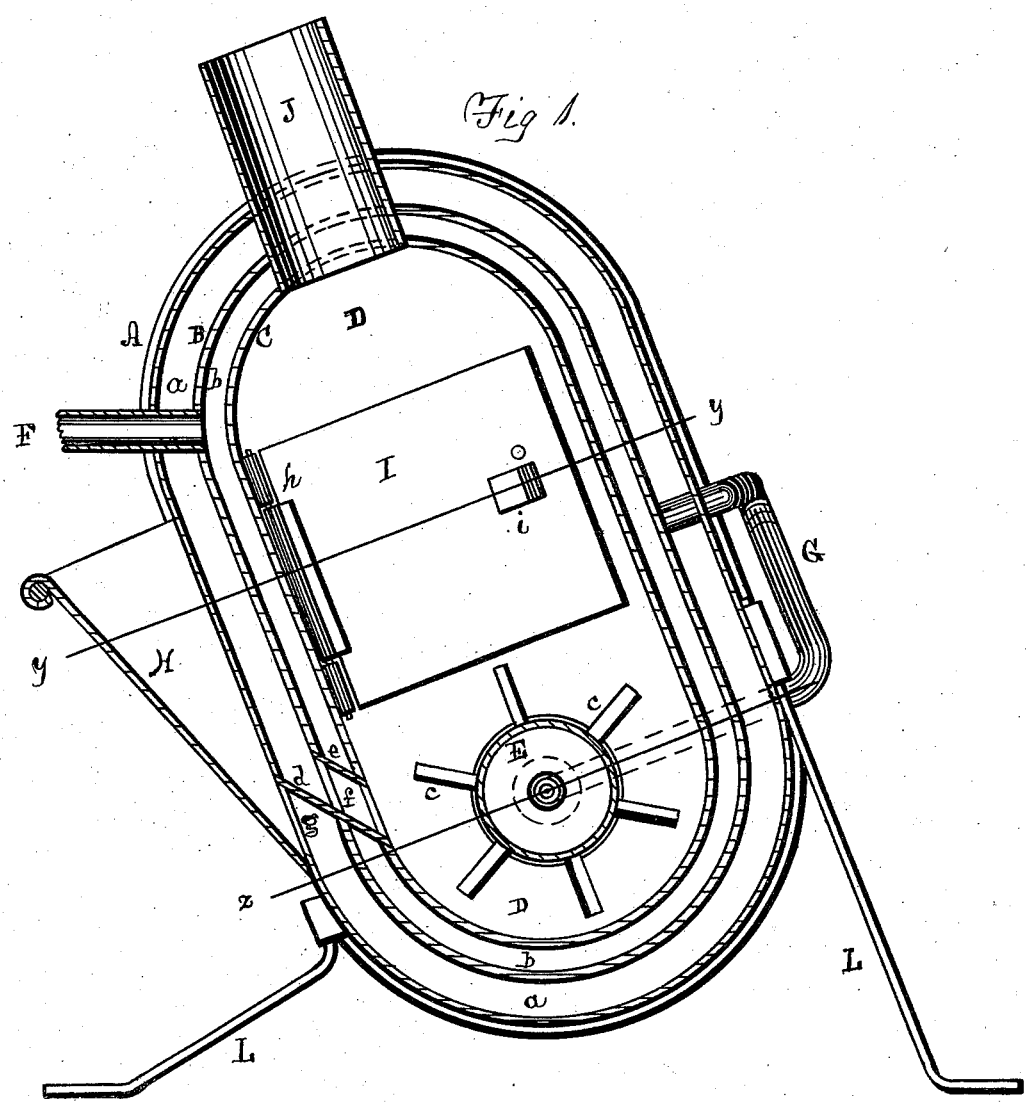

2 Sheets--Sheet 1.

T. WEBBER.
Apparatus for Treating Offal.

No. 156,321. Patented Oct. 27, 1874.

Witnesses
E. A. West
O. W. Bond

Thomas Webber
Inventor

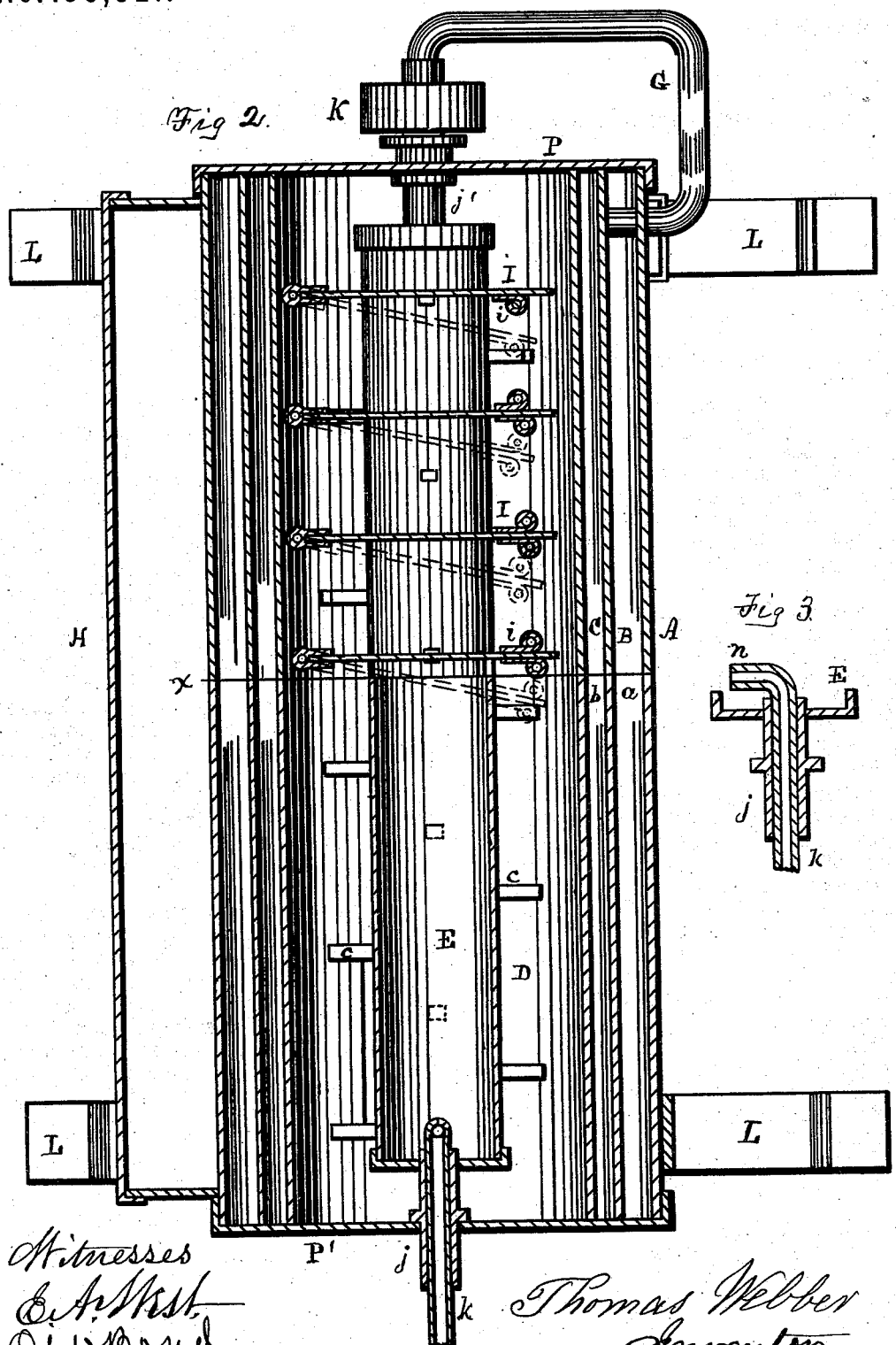

UNITED STATES PATENT OFFICE.

THOMAS WEBBER, OF CHICAGO, ILLINOIS, ASSIGNOR TO ORVILLE H. TOBEY, OF SAME PLACE.

IMPROVEMENT IN APPARATUS FOR TREATING OFFAL.

Specification forming part of Letters Patent No. 156,321, dated October 27, 1874; application filed March 14, 1874.

*To all whom it may concern:*

Be it known that I, THOMAS WEBBER, of the city of Chicago, in the county of Cook and State of Illinois, have invented new and useful Improvements in Apparatus for Drying Offal and other substances, of which the following is a full description, reference being had to the accompanying drawings, consisting of two sheets, in which—

Figure 1 is a vertical section on line $x$ of Fig. 2; Fig. 2, a horizontal section, one-half being taken on line $y$ of Fig. 1 and the other half on line $z$ of Fig. 1; and Fig. 3 is a detail.

In the drawings, A, B, and C represent three concentric walls, having suitable ends P P'. The space $a$ between A and B is for air. The space $b$, between B and C, is for steam. D is the chamber within which the offal is dried. I prefer to make the walls of this chamber oval instead of circular. $d$ is a partition across the spaces $a$ $b$, and extending the whole length thereof. E is a corresponding partition across the space $b$. $f$ is an air-passage. $g$ is an opening for the admission of air from the outside into $a$; and H, a receptacle into which the air passes before it enters the chamber $a$. E is a cylinder, supported by means of suitable hollow journals $j$ $j'$ on the ends P P'. Upon this cylinder are a number of arms or stirrers, $c$. F G are steam-pipes; J, outlet for the vapors from the chamber D; K, driving-pulley; L, supports; $k$, a tube passing through the journal $j$ into the cylinder E, the inner end $n$ of which tube $k$ is bent downward and reaches nearly to the wall of the cylinder E. I are wings, each being hinged at $h$ to the walls of the chamber D. They are connected together by means of rods, which may be inserted in the eyes or loops $i$.

In Fig. 1 the apparatus is represented inclined, as I have found that in this position it is more effective than when standing upright. In the end P is a suitable opening for the introduction of the offal, and in the other end a suitable opening for its discharge.

In use, the offal or other substance may be introduced and discharged continuously. Steam is to be brought into the passage $b$ through the pipe F, while air is to be introduced into the passage $a$ through the opening $g$. This air will be prevented by the partition $d$ from passing directly up, but will pass around in the passage $a$, and will be heated in its passage by the steam in $b$, and the air so heated will pass through the opening $f$ into the chamber D. The steam will also pass from $b$ through G into the cylinder E. This cylinder being rotated rapidly will, with the aid of the arms $c$, keep the offal thoroughly stirred up and in constant motion, and it will be rapidly dried by means of the heat from the wall C and cylinder E, and by means of the hot air introduced through $f$, the moisture being rapidly carried off through J. The wings I can be adjusted by means of a rod connected therewith and passing to the outside of the device, so as to facilitate or retard the movement of the offal through the chamber. If the wings be placed in the position represented by the dotted lines in Fig. 2, the offal will be thrown up against them by the arms $c$, and, falling back, will be somewhat retarded in its progress.

It is important to dispose of the condensation in the cylinder E, and this I do by means of the bent tube $k$ $n$—the pressure of the steam within the cylinder forcing the condensation out through this tube. The condensation in $b$ can be disposed by a drip-hole in the usual manner. A slide may be used to regulate the admission of air to the chamber D.

I do not claim a tubular agitator and a surrounding jacket; but

What I claim as new is as follows:

1. The combination of the chamber D, steam-chamber $b$, and air-chamber $a$, substantially as and for the purpose specified.

2. The tube $k$ $n$, in combination with the steam-cylinder E and chamber D, substantially as and for the purpose specified.

THOMAS WEBBER.

Witnesses:
E. A. WEST,
O. W. BOND.